PROCESS FOR REPRODUCING MAGNETIZATION PATTERN BY PLATING

Filed Oct. 7, 1971

United States Patent Office 3,814,672

Patented June 4, 1974

3,814,672

PROCESS FOR REPRODUCING MAGNETIZATION PATTERN BY PLATING

Tatsuji Kitamoto and Masashi Aonuma, Kanagawa, and Kazuhiro Kawaziri, Saitama, Japan, assignors to Fuji Photo Film Co., Ltd., Kanagawa, Japan Filed Oct. 7, 1971, Ser. No. 187,251

Claims priority, application Japan, Oct. 7, 1970, 45/88,139

Int. Cl. C23b *5/50, 5/54;* C23c *3/02*

U.S. Cl. 204—12 28 Claims

ABSTRACT OF THE DISCLOSURE

A magnetization pattern on a magnetic recording medium is reproduced by plating a ferromagnetic metal or alloy on a thin layered support such as polyethylene terephthalate film while bringing the support into intimate contact with the magnetic recording surface until the average thickness of the resulting plated layer reaches at least 50 A., separating the magnetic recording surface, and continuously plating the support in the substantial absence of an exterior magnetic field whereby the corresponding magnetization pattern is reproduced on the thin support.

BACKGROUND OF THE INVENTION

1. Field of the invention

This invention relates to a process for reproducing a magnetization pattern by plating.

2. Description of the prior art

Previously, there have been proposed various magnetic recording methods in which the extent and direction of the magnetization are partially controled on a magnetic thin film by a suitable process so as to record various pieces of information such as electric signals, sounds, or images. One typical method comprises converting electrical signals to the intensity of a magnetic field using an electromagnetic converting element (magnetic head) in the form of a small-sized electromagnet and applying this signal to a magnetic recording medium moving at a constant speed with respect to the magnetic head, thereby recording the original signal in the form of changes in residual magnetization. In another method involving heat, a magnetic recording medium which has been magnetized in a predetermined direction is heated selectively by an electron beam or a laser beam to cause magnetic erasing and thereby to form changes in the residual magnetization.

The process of the present invention is different from these conventional processes since it is based on the discovery that when a metallic element which is normally magnetic and in an ionized state in a plating bath of the type used in electric plating or electroless plating, is plated and precipitated the crystals grow on the support and the size of the particles or the thickness of the film increases. Furthermore, when the metal is subjected to an exterior magnetic field in a transient stage from a paramagnetic state to a ferromagnetic state, the ratio of the residual magnetic flux density to the saturated residual magnetic flux density of the plated layer changes according to the intensity of the magnetic field. Also discovered is that it is not necessary to subject the metal to the magnetic field throughout the entire reaction period during plating, but that the desired result can be obtained by doing so until the average thickness of the plated layer (the value obtained by dividing the weight of the metal plated by the area of the plated surface and the specific gravity of the plated substance) reaches at least 50 A.

It is an object of the present invention to provide a process in which plating is performed while applying an exterior magnetic field and in which the residual magnetization of the plated layer is changed according to the intensity of the exterior magnetic field.

Another object of the invention is to provide a new process suitable for reproducing signals on magnetic tape.

Still another object of the invention is to provide a process for reproducing magnetic images such as by magnetography.

Yet another object of the invention is to provide a process for easily reproducing magnetic tape by plating wherein the time needed to bring a magnetic tape having signals recorded thereon into intimate contact with a plated tape to which the signals are to be transferred is shortened, thereby avoiding long periods of contact between them in the plating bath.

SUMMARY OF THE INVENTION

According to the present invention, there is provided a process for reproducing a magnetization pattern by plating, which comprises bringing a thin layered support to be plated into intimate contact with a magnetic recording surface having a magnetization pattern to be reproduced, performing the plating until the average thickness of the resulting magnetic plated layer reaches at least 50 A., separating the magnetic recording surface, and continuously plating the support in the substantial absence of a magnetic field.

The term "plating," used in the present specification and claims, means a method whereby a thin film of a ferromagnetic metal such as iron, cobalt, or nickel, or of a ferromagnetic alloy such as Co-Ni, Fe-Co-Ni, Co-Ni-Cu, Co-(P), Co-Ni (P), Ni-Co-Ag, Ni-Co-Nd, Ni-Co-Ce, Ni-Co-Zn, Ni-Co-B, or Co-B is formed electrically (electric plating) or chemically (electroless plating), or by a combination of electric and electroless platings.

Examples of electro-plating baths are a sulfate bath, a wholly chloride bath, a sulfamic acid bath, a borofluoride bath, a pyrophosphoric acid bath, or a sulfate/chloride bath. Examples of the electroless plating bath include a sulfate bath, a chloride bath, a hypophosphorous acid bath, an acetate bath, and a formate bath. As a reducing agent, there can be used hypophosphites, boron hydride compounds and derivatives thereof, hydrazine, and the like.

The magnetization pattern to be reproduced refers to the distribution of the extend and the direction of the residual magnetization on a magnetic recording layer in the form of tapes, sheets, flat plates, or cylinders. Examples of the magnetization pattern that can be used in the present invention are those obtained by dispersing $\gamma$-$Fe_2O_3$ powder, $\gamma$-$Fe_2O_3$ powder doped with Co, magnetite powder, magnetite doped with Co or other metal, $CrO_2$, Fe-Co-Ni, or an alloy of other composition in an organic binder such as vinyl chloride/vinyl acetate copolymer, cellulose derivatives, phenolic resins, epoxy resins, or polyurethane resins, coating the dispersion on a support to form a magnetic recording layer on a magnetic tape, magnetic sheet, magnetic disc or magnetic drum, or forming a magnetic recording layer of Fe-Co, Co-Ni, Co-P, Co-Ni-P, or Co-Ni-Cu by plating on a magnetic tape, magnetic sheet, magnetic disc, or magnetic drum instead of using the powdery magnetic material, and recording information such as sounds, images, or electric signals on such magnetic recording medium as the distribution of residual magnetization of different direction and extents.

The plating substrate layer on which the magnetization pattern is to be reproduced has a non-magnetic support layer or separable layer through which the plating substrate layer is to be brought into intimate contact with the magnetization pattern and a plated layer is formed thereon by plating until the average thickness of the plated layer reaches a suitable value above 50 A. Thus, by the magnetic field generated by the magnetization pattern, the resulting plated layer has a magnetization pattern corresponding to the former.

The thickness of the support layer or separable layer which defines the distance between the magnetic recording surface and the plated layer, is desirably substantially equal to one wavelength of the magnetization pattern of the magnetic recording layer. If it becames extremely larger than this, the resolving power at a portion having a high recording density is reduced. In recording magnetic images, electrical signals of relatively low recording density, or sound signals, a suitable support or separable layer is used which is obtained by vacuum evaporation of an electrically conductive metal such as copper on a polyester base having a thickness of 10 to 100μ, or by treating such a base with stannous chloride to activate it for electroless plating. In recording electrical signals of a high recording density of video signals, a very thin separable layer is used, having a thickness of less than 1μ formed on a substrate with the plating performed for a suitable period of time, and then the resulting plated layer is separated by a support to which an adhesive is attached. By these methods, the plating is performed under the influence of a magnetic field from the magnetization pattern of the substrate until the average thickness of the plated layer reaches at least 50 A., and then the thinly plated layer is separated from the substrate and is continuously plated.

DESCRIPTION OF THE PREFERRED EMBODIMENTS

Figure 2:
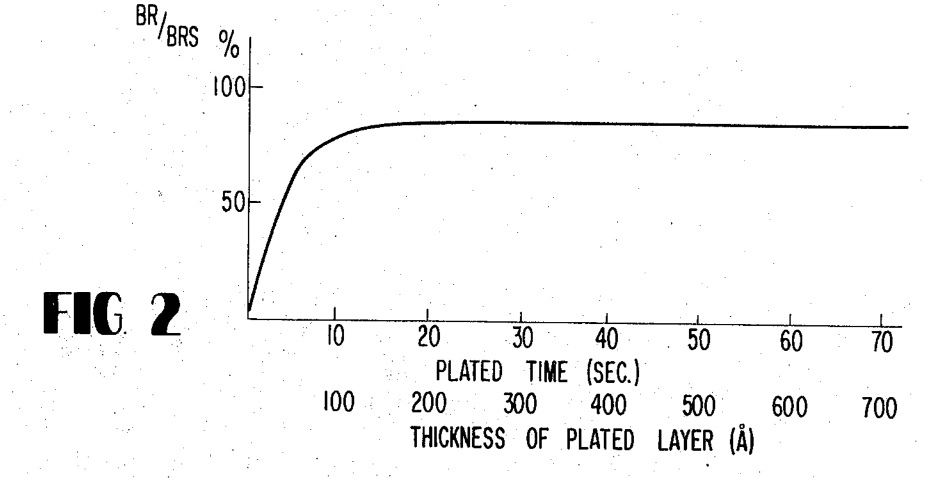
FIG. 2 is a diagram with the curve showing the thickness of the plated layer obtained under the influence of the exterior magnetic field in relation to the ratio of the residual flux density to the saturated residual flux density.

As is seen from FIG. 2, the effect of plating becomes apparent if the plating is performed under the influence of the magnetization pattern of the substrate until the average thickness of the plated layer reaches at least 50 A. The thickness of the plated layer as the final product need be at least 0.1μ, preferably about 1μ, in view of the sensitivity of the detecting device. In order to attain this thickness, a period of 50 seconds is needed to form a plated layer of 0.1μ thickness at a current density of 0.6 a./dm.² under the ordinary plating conditions. For a thickness of 1μ, it is necessary to immerse both the substrate and the support or separable layer in a plating bath for about 500 seconds while being in intimate contact with each other. Generally, the plating both has a strong acidity or alkalinity or oxidizing properties, and, therefore, when the material is immersed in it for prolonged periods of time, changes in the magnetic recording layer of the substrate are observed. Furthermore, in continuous plating, the magnetic recording layer and the support or separable layer tend to deviate from each other owing to the difference in the rate of moving or changes in length caused by moisture absorption and good reproduction of the magnetization pattern becomes difficult. Hence, minimization of the time needed for intimate contact with the magnetization pattern of the substrate is very advantageous for overcoming these difficulties. This is one of the purposes of the present invention.

The following Examples will illustrate the present invention in detail.

EXAMPLE 1

(1) A 50μ thick electrolized copper plate was immersed in a plating bath of the following composition, and electrically plated for 5 minutes under the following conditions.

COMPOSITION OF THE PLATING BATH

| | G. |
|---|---|
| $NiSO_4.7H_2O$ | 60 |
| $NiCl_2.6H_2O$ | 10 |
| $CoSo_4.7H_2O$ | 60 |
| $CoCl_2.6H_2O$ | 10 |
| $CuSO_4.5H_2O$ | 5 |
| $H_3BO_3$ | 15 |
| Formalin | 2 |
| Sodium 1,5-naphthalenedisulfonate | 3 |
| Water to make 1 liter. | |

ELECTROPLATING CONDITIONS

| | |
|---|---|
| Temperature of the plating bath ° C. | 40 |
| pH of the plating bath | 5.0 |
| Current density a./dm.² | 0.6 |

The thickness of the plated layer deposited per second under the above conditions was 10 A. The thickness of the plated layer was calculated by the weight method.

During the plating operation, a uniform exterior magnetic field was exerted on the plating both. The intensity of the exterior magnetic field was changed for each sample. The ratio of *Br/Brs* (the residuel flux density to the saturated residual flux density) was determined with respect to every sample. The relation between the *Br/Brs* percent and the intensity of the exterior magnetic field (unit oe.) is shown in FIG. 1 with respect to all the samples tested.

(2) An electrolized copper plate was electrically plated in the same way as in (1) above. The intensity of the exterior magnetic field to be exerted on the plating bath was maintained constant (100 oe.), and the plating time (i.e., the thickness of the plated layer), was changed for each of ten samples. After electroplating under the influence of the exterior magnetic field, the electroplating was performed again in the absence of magnetic field. The total plating time was 5 minutes. The *Br/Brs* value of each of the samples in the direction of the magnetic field was determined. The relation of the *Br/Brs* values percent and the thickness of the plated layer (unit: A., proportional to the plating time) obtained by electroplating under the influence of the exterior magnetic field is shown in FIG. 2.

Figure 1:
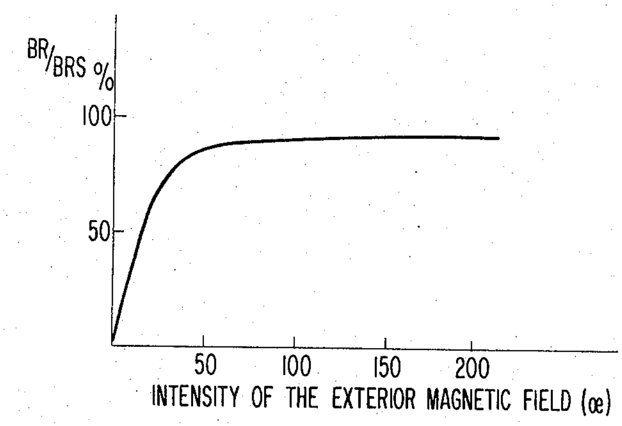
FIG. 1 is a diagram with the curve showing the intensity of the exterior magnetic field during plating in relation to the ratio of the residual flux density to the saturated residual flux density.

It is seen from the results shown in FIGS. 1 and 2, that the plated layer is fully magnetized even in a very weak magnetic field. Furthermore, if the plating is performed until the average thickness of the plated layer reaches at least 10 A., the plated layer is fully magnetized in the direction of the initial magnetic field after that point even in the absence of an exterior magnetic field.

EXAMPLE 2

Signals of 1 kHz. were put into an audio tape coated with $\gamma$-$Fe_2O_3$ and moving at a tape speed of 19 cm./sec. The magnetic surface of the audiotape was brought into intimate contact with a support layer obtained by vacuum evaporation of 0.4μ thick copper on a polyethylene terephthalate base having a thickness of 25μ, and electroplating was performed under the following conditions from a both of the composition described below.

COMPOSITION OF THE PLATING BATH

| | G. |
|---|---|
| $NiSO_4.7H_2O$ | 30 |
| $NiCl_2.6H_2O$ | 5 |
| $CoSO_4.7H_2O$ | 30 |
| $CoCl_2.6H_2O$ | 5 |
| $NaH_2PO_2.H_2O$ | 2 |
| $NH_4Cl$ | 60 |
| Sodium 1,5-naphthalene-disulfonate | 5 |
| Water to make 1 liter. | |

PLATING CONDITIONS

| | |
|---|---|
| Current density ........ a./dm.² | 0.6 |
| pH of the plating bath | 3.0 |
| Temperature of the plating bath ........ ° C. | 40 |

The following experiments were conducted under the above conditions.

(A) The audio tape was brought into intimate contact with the polyethylene terephthalate base and plating was performed in this state for 280 seconds until the average thickness of the plated layer reached 0.6μ.

(B) After a lapse of 30 seconds from the initiation of plating, the polyethylene terephthalate base was separated from the audio tape, and the polyethylene terephthalate base alone was plated further until the average thickness of the plated layer reached 0.6μ. During this period of 30 seconds, the thickness of the plated layer became 600 A.

The measurement of the thickness of the plated layer was effected by the weight method.

Each of the plated tapes was measured for its reproducing output and it was found that the reproducing output of the plated tape in Run A above was +5 dβ. In Run B, the reproducing output of the plated tape was +4.8 dβ. Almost the same reproducing output was obtained both in Runs A and B.

Incidentally, the reproducing output of the audio tape used in Runs A and B was + 3 dβ.

EXAMPLE 3

Letters were written on a 25μ thick polyethylene terephthalate base by a magnetic paint containing a thermosetting polyurethane resin. After drying and curing, the base was uniformly magnetized with a direct current at 1,000 volts to form a plating substrate.

The substrate was first immersed in a bath consisting by volume of 4 parts of hydroquinone, 1 part of pyrocatechol, and 40 parts of acetone for 15 seconds. Subsequently, its surface was sensitized with a bath consisting of 100 g./liter of $SnCl_2$, 150 g./liter of NaOH, and 175 g./liter of Rochelle salt. The surface was then activated with a bath consisting of 1 g. of $PdCl_2$, 100 cc. of HCl, and 4,000 cc. of water. Thereafter, the substrate was subjected to electroless plating from a bath of the formulation below. In one minute, the plating was interrupted, and a 25μ thick polyethylene terephthalate base having a nitrile rubber-type adhesive layer was adhered to the plated surface and the plated layer was separated from the plating substrate. The average thickness of the plated layer was about 350 A.

The resulting plated layer was further subjected to electroless plating for 13 minutes to increase the total thickness of the plated layer to about 0.1μ.

FORMULATION OF THE PLATING BATH

| | G./liter |
|---|---|
| $CoCl_2.6H_2O$ | 9.5 |
| $NiCl_3.6H_2O$ | 0.36 |
| $NaH_2PO.H_2O$ | 5.3 |
| $NH_4Cl$ | 10.7 |
| $H_3BO_3$ | 30.9 |
| $C_6H_8O_7.H_2O$ | 26.5 |

CONDITIONS

| | |
|---|---|
| pH of the bath, 8.0 (adjusted with NaOH solution). | |
| Temperature ........ ° C. | 80 |

The deposited plated layer was developed with a toner containing magnetite as pigment, and the letters written with the magnetic paint on the plating substrate could be developed in the reversed state.

EXAMPLE 4

Figure 3:
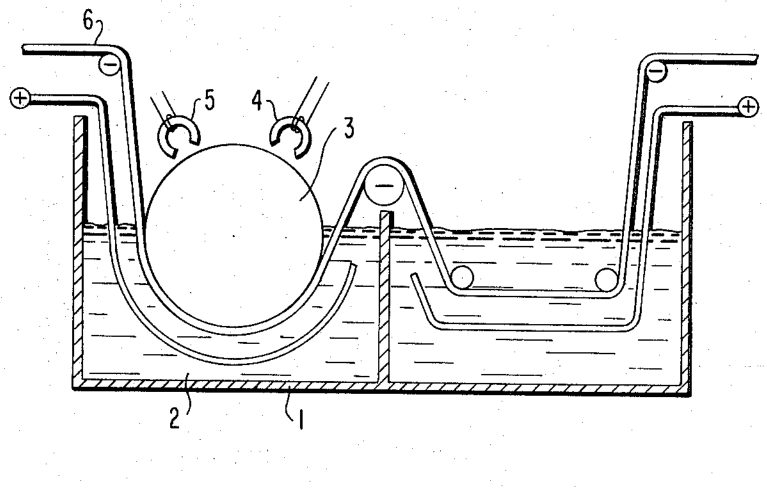
FIG. 3 is a schematic view showing a specific embodiment of the present invention.

Using a plating bath 1 shown in FIG. 3, electroplating was performed in an Ni-Co-Cu bath 2 of the same composition as set forth in Example 1. First, an Ni-Co-P type magnetic layer (Hc 250 oe.) was plated on the surface of a drum having a diameter of 30 cm. and an Rh layer was plated thereon in a thickness of 0.1μ to form a magnetic drum 3. On the surface of the magnetic drum, there were provided an erasing head 4 and a recording head 5. Signals are recorded on the magnetic drum 3 by means of the recording head 5 and the signals are erased by the erasing head 4, whereby another recording can be again made by the recording head 5. In FIG. 3, the reference symbol ⊖ represents a negative pole roll, and ⊕ a positive pole portion.

The running speed of a polyethylene terephthalate base 6 having deposited thereon copper by vacuum evaporation was synchronized with the rotating speed of the magnetic drum surface, and adjusted to a speed of 19 cm./sec. In the plating bath the drum 3 rotated while the surface of the polyethylene terephthalate base 6 was in intimate contact with the surface of the magnetic drum, and the polyethylene terephthalate base was immersed for 3 seconds in the plating bath by the rotation of the drum. During this time, a magnetic layer was plated on the copper surface at a current density of 1.2 a./dm.². The polyethylene terephthalate base was separated from the magnetic drum and again immersed in a bath of the same composition. The plating was performed for 150 seconds at a current density of 0.6 a./dm.². The thickness of the deposited plated layer was 0.3μ, and the thickness of the magnetic layer plated while being in contact with the magnetic drum was 120 A.

The Hc of the magnetic plated tape plated by the above apparatus and process steps was 800 oe., and the signals recorded on the magnetic drum were reproduced on the plated tape.

By using such an apparatus, it was possible to produce a plated tape while recording signals on the magnetic drum, and thereby continuously producing a recording tape.

What is claimed is:

1. A process for reproducing a magnetization pattern existing in a first magnetic recording layer comprising:

(a) intimately contacting a first surface of a thin nonmagnetizable support with said first magnetic recording layer having said magnetization pattern;

(b) while said first surface is in contact with said first magnetic recording layer, plating onto a second surface of said support opposite said first surface a magnetic layer composed of a ferromagnetic metal or a ferromagnetic alloy and continuing said contacting and said plating until the average thickness of the plated magnetic layer is at least 50 angstroms; and (c) separating said support from said first magnetic recording layer and continuing said plating in the substantial absence of a magnetic field to produce a plated magnetic layer having a desired thickness, whereby said plated magnetic layer has a magnetization pattern corresponding to the magnetization pattern existing in said first magnetic recording layer.

2. The process of claim 1 wherein said first magnetic recording surface is in the form of a tape, sheet, disc or drum.

3. The process of claim 1 wherein the plating operation in each of said steps (b) and (c) comprises electroless plating, electroplating or combinations thereof.

4. The process of claim 1 wherein said plating in said step (c) is continued until the thickness of said plated layer is 1 micron.

5. The process of claim 1 wherein said plating in said step (c) is continued until the thickness of said plated magnetic layer is 0.1 to 1.0 micron.

6. The process of claim 1 wherein said support has a thickness substantially equal to one wavelength of the magnetization pattern existing in said first magnetic recording layer.

7. The process of claim 1 wherein said support is polyethylene terephthalate.

8. The process of claim 1 wherein said ferromagnetic metal is iron, cobalt or nickel and wherein said ferromagnetic alloy is a cobalt-nickel alloy, an iron-cobalt-nickel alloy, a cobalt-nickel-copper alloy, a cobalt-phosphorous alloy, a cobalt-nickel-phosphorus alloy, a nickel-cobalt-silver alloy, a nickel-cobalt-neodymium alloy, a nickel-cobalt-cerium alloy, a nickel-cobalt-zinc alloy, a nickel-cobalt-boron alloy or a cobalt-boron alloy.

9. A process for producing a magnetization pattern existing in a first magnetic recording layer comprising:

(a) intimately contacting a first surface of a thin non-magnetizable support with said first magnetic recording layer having said magnetization pattern;

(b) while said first surface is in contact with said first magnetic recording layer, electroless plating onto a second surface of said support opposite said first surface a magnetic layer composed of a ferromagnetic metal or a ferromagnetic alloy and continuing said contacting and said electroless plating until the average thickness of the plated magnetic layer is at least 50 angstroms; and (c) separating said support from said first magnetic recording layer and continuing said electroless plating in the substantial absence of a magnetic field to produce a plated magnetic layer having a desired thickness, whereby said plated magnetic layer has a magnetization pattern corresponding to the magnetization pattern existing in said first magnetic recording layer.

10. The process of claim 9 wherein said first magnetic recording surface is in the form of a tape, sheet, disc or drum.

11. The process of claim 9 wherein said electroless plating in said step (c) is continued until the thickness of said plated magnetic layer is 1 micron.

12. The process of claim 9 wherein said electroless plating in said step (c) is continued until the thickness of said plated magnetic layer is 0.1 to 1.0 micron.

13. The process of claim 9 wherein said support has a thickness substantially equal to one wavelength of the magnetization pattern existing in said first magnetic recording layer.

14. The process of claim 9 wherein said support is polyethylene terephthlate.

15. The process of claim 9 wherein said ferromagnetic metal is iron, cobalt or nickel and wherein said ferromagnetic alloy is a cobalt-nickel alloy, an iron-cobalt-nickel alloy, a cobalt-nickel-copper alloy, a cobalt-phosphorous alloy, a cobalt-nickel-phosphorus alloy, a nickel-cobalt-silver alloy, a nickel-cobalt-neodymium alloy, a nickel-cobalt-cerium alloy, a nickel-cobalt-zinc alloy, a nickel-cobalt-boron alloy or a cobalt-boron alloy.

16. A process for reproducing a magentization pattern existing in a first magnetic recording layer comprising:

(a) intimately contacting a first surface of a thin-non-magnetizable support with said first magnetic recording layer having said magnetization pattern;

(b) while said first surface is in contact with said first magnetic recording layer, electroplating onto a second surface of said support opposite said first surface a magnetic layer composed of a ferromagnetic metal or a ferromagnetic alloy and continuing said contacting and said electroplating until the average thickness of the plated magnetic layer is at least 50 angstroms; and (c) separating said support from said first magnetic recording layer and continuing said electroplating in the substantial absence of a magnetic field to produce a plated magnetic layer having a desired thickness, whereby said plated magnetic layer has a magnetization pattern corresponding to the magnetization pattern existing in said first magnetic recording layer.

17. The process of claim 16 wherein said first magnetic recording surface is in the form of a tape, sheet, disc or drum.

18. The process of claim 16 wherein said electroplating in said step (c) is continued until the thickness of said plated magnetic layer is 1 micron.

19. The process of claim 16 wherein said electroplating in said step (c) is continued until the thickness of said plated magnetic layer is 0.1 to 1.0 micron.

20. The process of claim 16 wherein said support has a thickness substantially equal to one wavelength of the magnetization pattern existing in said first magnetic recording layer.

21. The process of claim 16 wherein said support is polyethylene terephthalate.

22. The process of claim 16 wherein said ferromagnetic metal is iron, cobalt or nickel and wherein said ferromagnetic alloy is a cobalt-nickel alloy, an iron-coblat-nickel alloy, a cobalt-nickel-copper alloy, a cobalt-phosphorous alloy, a cobalt-nickel-phosphorus alloy, a nickel-cobalt-silver alloy, a nickel-cobalt-neodymium alloy, a nickel-cobalt-cerium alloy, a nickel-cobalt-zinc alloy, a nickel-cobalt-boron alloy or a cobalt-boron alloy.

23. A process for reproducing a magnetization pattern which comprises:

(a) recording magnetic signals on the upper portion of a drum having a magentic layer on its surface and having the lower portion of said drum immersed in a plating bath containing a magnetic matetrial composed of ferromagnetic metals or ferromagnetic alloys;

(b) placing in intimate contact with the surface of said drum a first surface of a thin non-magnetizable support in the form of a film, tape or sheet;

(c) rotating said drum and said support while in contact together through said plating bath for a period sufficient to plate a magnetic layer composed of a ferromagnetic metal or a ferromagnetic alloy of at least 50 angstroms average thickness on a second surface of said support opposite said first surface;

(d) separting said support having said plated magnetic layer thereon from said drum; and (e) immersing said support into a second plating bath containing a magnetic material composed of ferromagnetic alloys or ferromagnetic metals and plating additional magnetic material composed of a ferromagnetic alloy or a ferromagnetic metal onto said support, said immersing and said plating being conducted in the substantial absence of a magnetic field.

24. The process of claim 23 wherein said plating operation in each of said steps (c) and (e) comprises electroless plating, electroplating or combinations thereof.

25. The process of claim 23 wherein said plating in said step (e) is continued until the thickness of said plated magnetic layer is 1 micron.

26. The process of claim 23 wherein said plating in said step (e) is conducted until the thickness of said plated magnetic layer is 0.1 micron.

27. The process of claim 23 wherein said support has a thickness substantially equal to one wavelength of the magnetization pattern existing in said first magnetic recording layer.

28. The process of claim 23 wherein said support is polyethylene terephthlate.

References Cited

UNITED STATES PATENTS

| | | | |
|---|---|---|---|
| 3,451,128 | 6/1969 | Reed et al. | 117—17.5 |
| 3,282,723 | 11/1966 | Melillo | 117—239 |
| 3,523,823 | 8/1970 | Kefalas | 117—239 |
| 3,483,029 | 12/1969 | Koretzky et al. | 117—239 |

MICHAEL SOFOCLEOUS, Primary Examiner

U.S. Cl. X.R.

117—45, 130 E, 238, 239, 240; 204—28, 38 BS, 40; 346—1